United States Patent [19]

Chenoweth et al.

[11] 4,263,634

[45] Apr. 21, 1981

[54] MAGNETIC DISK-JACKET ASSEMBLY

[75] Inventors: Roger D. Chenoweth, Rochester; Donald J. Smith, Byron, both of Minn.

[73] Assignee: International Business Machines Corporation, Armonk, N.Y.

[21] Appl. No.: 75,858

[22] Filed: Sep. 17, 1979

[51] Int. Cl.³ .............................................. G11B 23/02
[52] U.S. Cl. ..................................... 360/133; 206/444
[58] Field of Search ................... 360/133, 99; 206/444

[56] References Cited

U.S. PATENT DOCUMENTS 4,038,693   7/1977   Huffine et al. ....................... 360/133

OTHER PUBLICATIONS

Bothun, "Encased . . . Wiper", IBM Tech. Disc. Bull., vol. 19 No. 12, May 1977, p. 4720.

Primary Examiner—Robert S. Tupper
Attorney, Agent, or Firm—R. W. Lahtinen

[57] ABSTRACT

A disk-jacket assembly including a flexible disk rotatably disposed in a square jacket having radially extending registering slots in its two thicknesses for receiving a pair of opposite transducers or alternately a single transducer in one slot and a pressure member in the other slot. Panels of porous low friction dusting fabric are disposed between the faces of the disk and the opposite inner faces of the jacket. The dusting fabric has slots coincident with the slots in the jacket, and the dusting fabric slots are wider than the jacket slots particularly for spacing the disk entry side edges of the jacket slots from the adjacent edges of the fabric to substantially prevent loose fibers on the fabric extending into the jacket slots.

7 Claims, 8 Drawing Figures

MAGNETIC DISK-JACKET ASSEMBLY

BACKGROUND OF THE INVENTION

The invention relates to flexible magnetic disks and more particularly to disk-jacket assemblies in which such disks are rotatably disposed in jackets of more rigid material.

It has previously been proposed that a flexible magnetic disk be rotatably disposed in a containing jacket of more rigid material with the internal surfaces of the jacket having affixed thereon a porous dusting fabric or wiper for maintaining the disk free of contaminant that might interfere with reliable data transfer between a transducer and the disk. The two jacket thicknesses are provided with registering radially extending slots extending also through the dusting fabric, and a transducer may extend through one of the slots into contact with the disk, while a supporting pressure pad may extend through the other slot to support the disk, for data transfer with respect to the disk. Alternately, two opposite transducers may extend through the slots into data transferring contact with the disk. Such constructions are shown in Flores et al, U.S. Pat. No. 3,668,658, Huffine et al, U.S. Pat. No. 4,038,693 and Castrodale et al, U.S. Pat. No. 4,089,029.

In the production of such disk-jacket assemblies, it has been common to bond a layer of the porous dusting fabric to one surface of a blank of the more rigid jacket material and then punch through both the jacket material and fabric in a single stroke to form the slots. This resulted in the edges of the fabric being coincident with the edges of the slots and resulted also in fibers from the fabric migrating or extending from the fabric into the slots on disk rotation thus causing unreliable data transfer by the transducers extending through the slots into contact with the disk. These trouble causing fibers in the data transfer slots of the jacket occurred particularly when overused dulled punches were used, resulting in undue fraying of the fabric.

SUMMARY OF THE INVENTION

It is an object of the present invention to provide an improved disposition and construction of the porous dusting fabric in a slotted jacket for a rotatable magnetic disk with which free fibers or frayed fibers from an adjacent edge of the fabric do not substantially exist in the slots to interfere with data transfer using a transducer extending into contact with the disk.

In a preferred form of the invention, a pair of panels of porous dusting fabric are disposed on each of the two inside surfaces of a flexible magnetic disk receiving jacket. These panels are spaced by gaps which are wider than the jacket slots and in which the jacket slots are disposed, and the edges of the fabric panels are thus out of register with the edges of the jacket slots. These edges of the panels are formed by edge sharpened slitter wheels, so that these edges are cut rather than the result of tearing, and so that the dusting fabric edges have a minimum number of frayed and free fibes that might lodge beneath a transducer in data transferring contact with the disk.

DESCRIPTION OF THE PREFERRED EMBODIMENT

Figure 1:
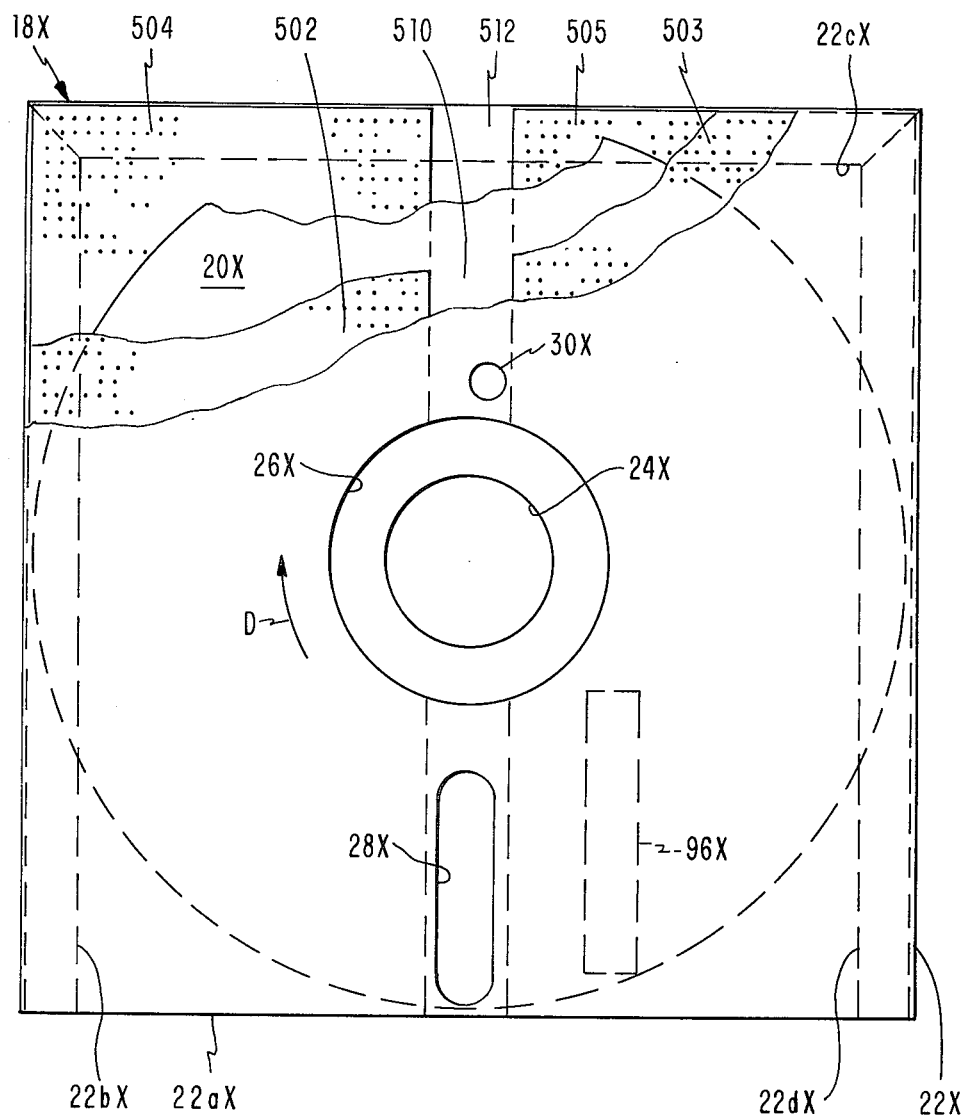
FIG. 1 is a front elevational view of a disk-jacket assembly incorporating the principles of the invention.

The structures of the present invention are quite similar to those disclosed in Huffine et al U.S. Pat. No. 4,038,693. In particular, the disk assembly 18X of the present invention shown in plan in FIG. 1 is quite similar to the disk assembly 18 of said U.S. Pat. No. 4,038,693, and parts of the disk assembly 18X and other parts hereof that correspond to parts disclosed in said U.S. Pat. No. 4,038,693 have the same reference characters but with the suffix "X" added.

Basically, the disk assembly 18X of the present invention differs from the disk assembly 18 of said U.S. Pat. No. 4,038,693 in that low friction wiper panels 502 and 503 which are located on one side of the flexible disk 20X and within the jacket 22X, and such panels 504 and 505 which are located on the other side of the disk 20X and within the jacket 22X, are used in lieu of the low friction layer 34 on the two sides of the disk 20 in the jacket 22 of said U.S. Pat. No. 4,038,693. The disk assembly 18X hereof is not disclosed as including the electrically conductive layer 35 of said U.S. Pat. No. 4,038,693; however, it will be understood, particularly from further description, that this conductive layer may be used in the jacket 22X hereof if desired.

Referring to FIG. 1, the disk assembly 18X may be seen to comprise the magnetic disk 20X disposed within the jacket 22X which is square. The disk 20X is of a thin flexible material, such as polyethylene terephthalate (Mylar) of about 0.075 mm thickness, and the disk 20X has an unoriented magnetic coating on both sides. The jacket 22X may be of a more rigid but still somewhat flexible vinyl sheet material, such as polyvinyl chloride acetate of 0.25 mm thickness, for example. The disk 20X has a central opening 24X, and the jacket 22X has larger aligned central openings 26X in its two thicknesses. In addition, the jacket 22X has aligned radial slots or openings 28X and aligned timing holes 30X in its two thicknesses.

Figure 2:
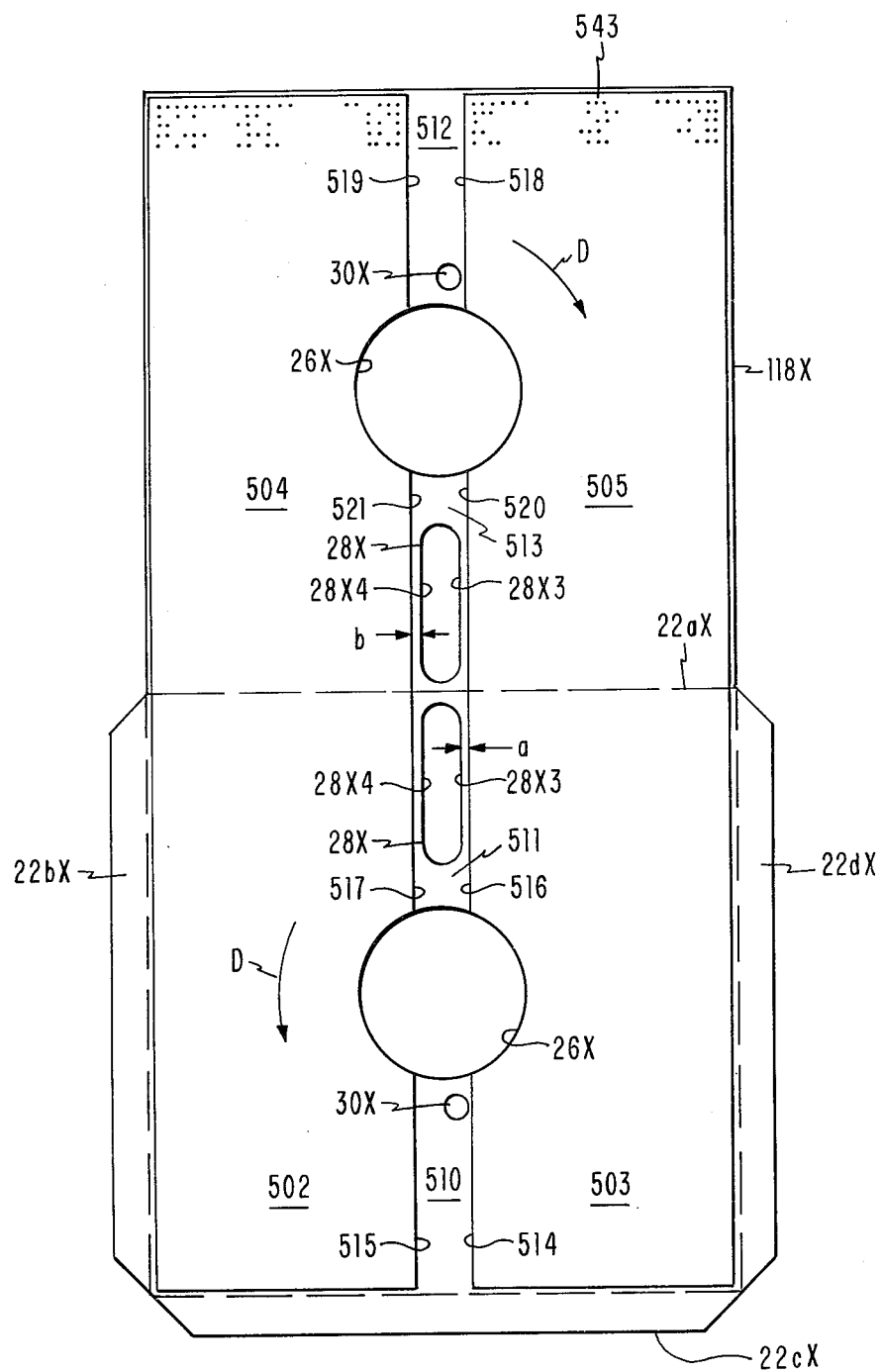
FIG. 2 is a plan view of a blank from which the jacket of the assembly may be made.

The panels 502, 503, 504 and 505 of a porous low friction wiping or dusting fabric acting as a disk cleaning material are disposed between the disk 20X and the inner faces of the jacket 22X to line the jacket. The panels 502 and 503 are on one face of the disk 20X, and the panels 504 and 505 are on the other face of the disk 20X. There are gaps or blank strips or openings 510 and 511 between the panels 502 and 503, and there are gaps or blank strips or openings 512 and 513 between the panels 504 and 505 (see FIG. 2). The gaps 510-513 are all of the same width and are defined by the panel edges 514-521 as shown in FIG. 2. A particular liner material suitable for the panels 502–505 may be rayon bonded with acrylic and may be 0.25 mm thick nominally, for example. The liner material functions as a wipe in the disk assembly 20X substantially as is described in connection with the wipe disclosed in U.S. Pat. No. 3,668,658, which may be also referred to for additional details of such a disk assembly as disclosed herein.

The jacket 22X may constitute a single piece of polyvinyl chloride acetate having two halves folded together to form a lower edge 22aX, and the jacket is provided with flaps 22bX, 22cX and 22dX which are bent over and are bonded on one outer surface of the assembly 18X in order to form a closed structure for the disk 20X (see FIGES. 1 and 6).

The disk assembly 18X may be used in the disk drive machine of FIGS. 4–7 of said U.S. Pat. No. 4,038,693. When so used, the disk 20X is gripped between the hub 48 and collet 52 of this U.S. Pat. No. 4,038,693, and the disk 20X is rotatively driven while the jacket 22X is held stationary. The transducer 72 of U.S. Pat. No. 4,038,693 during the operation of the disk drive machine extends through one of the slots 28X, and the pressure arm or pad 74 of U.S. Pat. No. 4,038,693 extends throuh the opposite slot 28X and supports the disk 20X with respect to the transducer 72 of this U.S. Pat. No. 4,038,693. The disk 20X is rotatably driven by the hub 48 of this U.S. Pat. No. 4,038,693 in direction D (see FIG. 1 hereof), and a data transfer takes place with respect to the disk 20X and the transducer at this time. The jacket 22X and the disk 20X are held in a fixed plane at the disk entry side edges 28X3 of the slots 28X (at which an increment of the disk 20X first appears in the slots 28X on rotation of the disk) by the platen 98 and pressure member 96 of said U.S. Pat. No. 4,038,693, and the outline 96X of the pressure member 96 of this U.S. Pat. No. 4,038,693 is shown in FIG. 1 hereof. The slots 28X have the disk exit side edges 28X4 as shown in FIG. 2.

The disk assembly 18X hereof could also be used in the data storage apparatus disclosed in U.S. Pat. No. 4,089,029, and in this case the two opposite aligned slots 28X hereof receive the two opposite transducers 150 and 152 of this U.S. Pat. No. 4,089,029 so that data recording may be accomplished using both sides of the disk 20X hereof.

Figure 3:
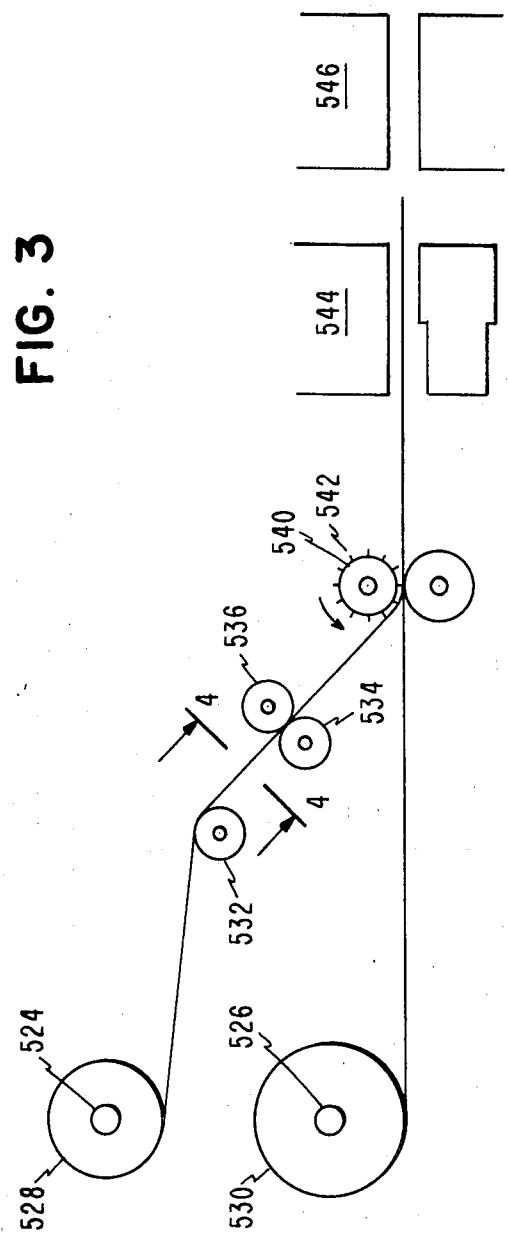
FIG. 3 is a schematic view of machinery including a pair of slitter wheels cooperating with a mandrel roll by means of which the jacket blanks may be manufactured.
Figure 4:
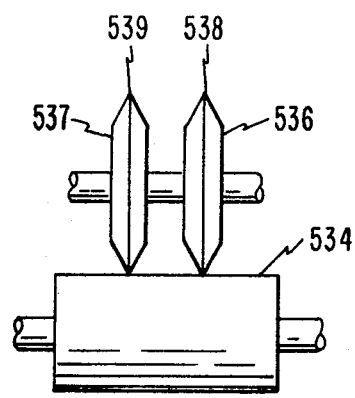
FIG. 4 is an end elevational view on an enlarged scale of the pair of slitter wheels and mandrel roll and taken on line 4—4 of FIG. 3.

The disk assembly 18X may be made from the blank 118X shown in FIG. 2 hereof, and the blank 118X may be made using the machinery shown in FIGS. 3 and 4 hereof. The machinery of FIGS. 3 and 4 includes a pair of mandrels 524 and 526 for respectively holding a roll 528 of the wiper material and a roll 530 of the polyvinyl chloride acetate jacket material. The wiper material as a strip passes from the roll 528 over an idler roll 532 and from thence over a mandrel roll 534 and beneath a pair of spaced slitter wheels 536 and 537 in cooperative relationship with the mandrel roll 534. The wheels respectively have the sharpened edges 538 and 539 (see FIG. 4). The wiper material passes from the mandrel roll 534 beneath a staker roll 540 along with the strip of polyvinyl chloride acetate derived from the roll 530. The staker roll 540 is heated and has a plurality of outwardly extending studs 542. The combination of the wiper and polyvinyl chloride acetate as a strip then passes from the staker roll 540 through a punch 544 which is effective for punching out the openings 26X, slots 28X and holes 30X and then passes through a punch 546 which is effective for punching out the individual blanks 118X from the strip of polyvinyl chloride acetate and wiper material.

The strip of wiper from the roll 528 is originally as wide as the widths of the two panels 504 and 505 plus the width of the gap 512 or 513 (or the widths of the panels 502 and 503 plus the width of the gap 510 or 511), and the two slitter wheels 536 and 537 coacting with the mandrel roll 534 cut the wiper strip to form the adjacent edges 514–515, 516–517, 520–521, and 518–519 of the wiper panels 502, 503, 504 and 505 (see FIG. 2). The central strip of the wiper between the slitter wheels 536 and 537 is removed from between the panels 502–505 by any suitable means and is discarded, and the panels 502 and 504 and the panels 503 and 505 pass in continuous strips of wiper material from the mandrel roll 534 to the staker roll 540. The heated studs 542 of the staker roll 540 function to emboss and heat seal together the panels 502–505 in continuous strips on the strip of polyvinyl chloride acetate from the roll 530, the sealing being at a multitude of points 543. The punch 544 is of any suitable construction to be effective to punch out the openings 26X, 28X and 30X in the continuous strip of polyvinyl chloride acetate from the roll 530. The panels 502–505 as will be observed from FIG. 2 overlap the openings 26X, and therefore the punch 544 punches through both the polyvinyl chloride acetate as well as the wiper material in forming the openings 26X. The slots 28X are narrower than the gaps 510–513, and therefore the punch 544 is effective only on the single thickness of the polyvinyl chloride acetate from the roll 530 in forming the slots 28X. The punch 546 is of any suitable construction to provide the individual blanks 118X as shown in FIG. 2, with the flaps 22bX, 22cX and 22dX, thus completing the blank 118X.

Figure 6:
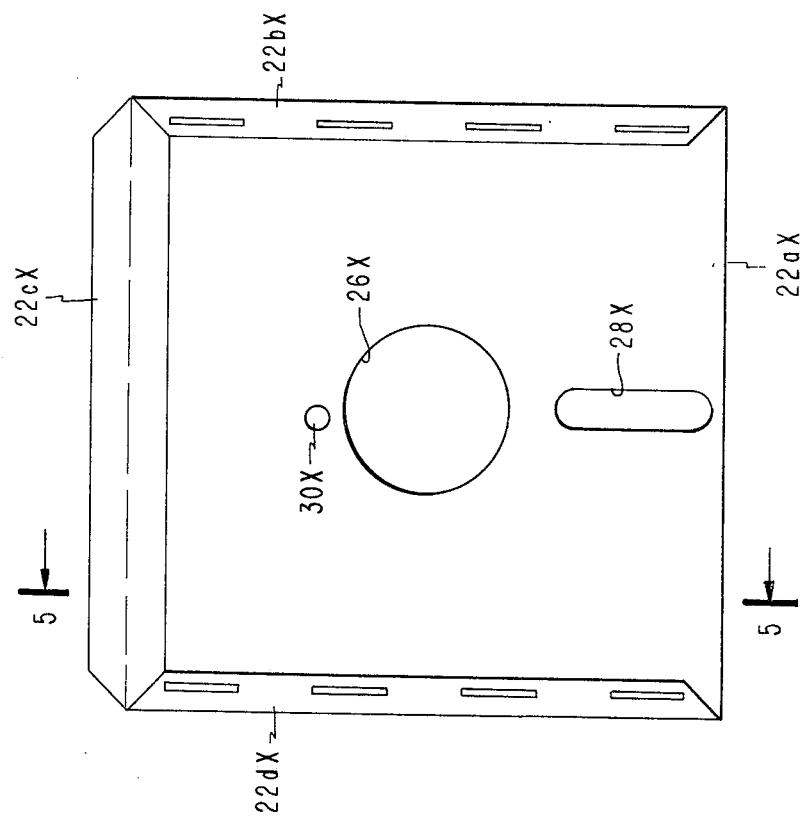
FIG. 6 is a rear elevational view of the jacket.
Figure 5:
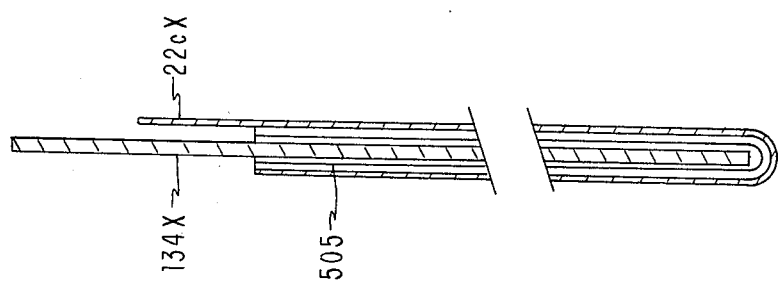
FIG. 5 is a longitudinal sectional view of the jacket in the process of manufacture.

One of the blanks 118X may be folded to provide the jacket 22X of proper spacing between the two thicknesses of the jacket 22X by using the sheet metal spacer 134X shown in FIG. 5 hereof (which corresponds with FIG. 12 of said U.S. Pat. No. 4,038,693). The blank 118X is folded along the line 22aX about the spacer 134X such that the slots 28X are in register with each other and such that the two openings 26X are in register with each other. The flaps 22bX and 22dX are then folded around the opposite thickness of the blank 118X and are then each sealed onto this thickness of the blank 118X. The blank 118X then appears as shown in FIG. 6, with the flap 22cX upstanding. The spacer 134X is then withdrawn from the folded blank 118X, and the disk 20X is inserted into this folded blank in place of the spacer 134X. the flap 22cX is then folded over onto the opposite thickness of the blank 118X and is heat sealed in place thereon to form the completed disk assembly 18X.

The disk 20X fits snugly within the jacket 22X particularly since the steel plate 134X has only a slightly greater thickness than the thickness of the disk 20X plus two thicknesses of the wiper material forming the opposite panels 502 and 504 and the opposite panels 503 and 505. The wiper panels 502–505 thus stay in snug wiping engagement with the disk 20X as it rotates (in direction D), maintaining the disk 20X continuously clean while inhibiting in no way the free rotation of the disk 20X.

As has been previously mentioned, previous disk assemblies have given some trouble on account of loose fibers of the low friction wiper material passing into the elongate transducer receiving slots in the disk assembly and between the transducer and the magnetic disk. This has been particularly true, since the elongate slots of these previous assemblies are simultaneously punched in the jacket and wiper layers (in the same way that the openings 26X and the wiper panels 502-505 are simultaneously punched by the punch 544 as above described) causing a fraying of the fibers of the wiper material at the edges of the slots. Such loose fibers (even if the wiper is slit or cut instead of being punched) may be 3 mm long, for example, of more than sufficient length to cause disruptive trouble by lodging between the transducer and the magnetic disk. In this connection, it may be mentioned that the slots 28X may be 13 mm wide, for example. The jacket 22X as a whole may be about 200 mm measured along each edge.

The adjacent edges 516 and 517 and the adjacent edges 520 and 521 of the wiper panels 502-505 have thus been spaced farther apart than the widths of the elongate slots 28X. The wiper edges 516 and 520 are thus upstream of the disk entry slot edges 28X3, and the wiper edges 517 and 521 are downstream of the disk exit slot edges 28X4, considering the direction D of rotation of the disk 20X. With the 13 mm widths of the slots 28X, the spacings of the edges 516 and 517 and the edges 520 and 521 may well be 19.05 mm with a tolerance of plus 1.5 mm and minus 0 mm. More particularly, the dimension a (see FIG. 2) between the edges 516 and 520 and the adjacent edges 28X3 of the slots 28X may be, for example, 3.18 mm with a tolerance of plus 1.5 mm and minus 0 mm. The distance b between the wiper edges 517 and 521 and the adjacent edges 28X4 of the slots 28X may be less and can for example be 1.65 mm although this dimension could conceivably be zero mm.

As has been above explained, the loose fibers from the fibrous wiper material used for the panels 502-505 may be as long as 3 mm, and thus it is desired that a substantial distance be maintained between the edges 516 and 520 and the adjacent edges 28X3 of the slots 28X to make sure that any such fibers do not extend into the slots 28X and thus interfere with the data transfer. These fibers will tend to travel in the direction D with disk rotation. The distance b can be less than the distance a, since any loose fibers tend to move with the disk 20X in direction D out of the slots 28X.

As has been previously explained, in previous diskettes in which the wiper material and polyvinyl acetate jacket material are punched by the same punches, so that the wiper material edges are coincident with the edges of the transducer receiving slots, the wiper material tends to become frayed, particularly when the punches become somewhat dulled. The slitter wheels 536 and 537 produce a cleaner cut than can be obtained by punches even under the best conditions, and therefore there is a minimum of loose fibers along the panel edges 516 and 520. More importantly, however, the edges 516 and 520 are spaced from the edges 28X3 of the slots 28X acting to further assure that no loose wiper fibers will extend into or migrate into the transducer receiving slots 28X.

The pressure pad position 96X is upstream (considering disk rotation in direction D) with respect to the slots 28X but is yet located within the panels 503 and 505 and close to the edges 516 and 520, and the pressure pad in conjunction with the associated platen thus holds the disk 20X in a fixed predetermined plane suitable for reliable data transfer by the transducer extending through a slot 28X and holds the liner panels 503 and 505 in firm contact with the disk 20X for efficient debris removal from the disk 20X by these wiper panels to assure that the cleanest disk surface possible occurs in the data transfer slots 28X. The slot edges 28X3 and the adjacent edge of the pressure pad outline 96X may, for example, by spaced about 18.8 mm apart.

It is, of course, essential that the disk 20X remain out of contact with the bare inner surfaces of the jacket 22X in order that the magnetic coating on the disk 20X be kept free of abrasions and scratches. For this reason, the widths of the gaps 510 and 512 are preferably held to 19.05 mm with a tolerance of plus 1.5 mm and minus 0 mm, so that, considering the flexibility of the 0.075 mm thick disk 20X, the disk will not flex and bend in its operation sufficiently to scrape against the inner surfaces of the jacket 22X in the gaps 510 and 512. In this connection, it is desirable that the panels 502-505 cover 90 percent of the inside surface of the jacket 22X. The illustrated construction of wiper panels 502-505 thus maintains the maximum protection of the disk 20X by the wiper panels 502-505 while yet keeping the panels 503 and 505 away from the data slot edges 28X3 on the pressure pad sides of the slots 28X.

Figure 7:
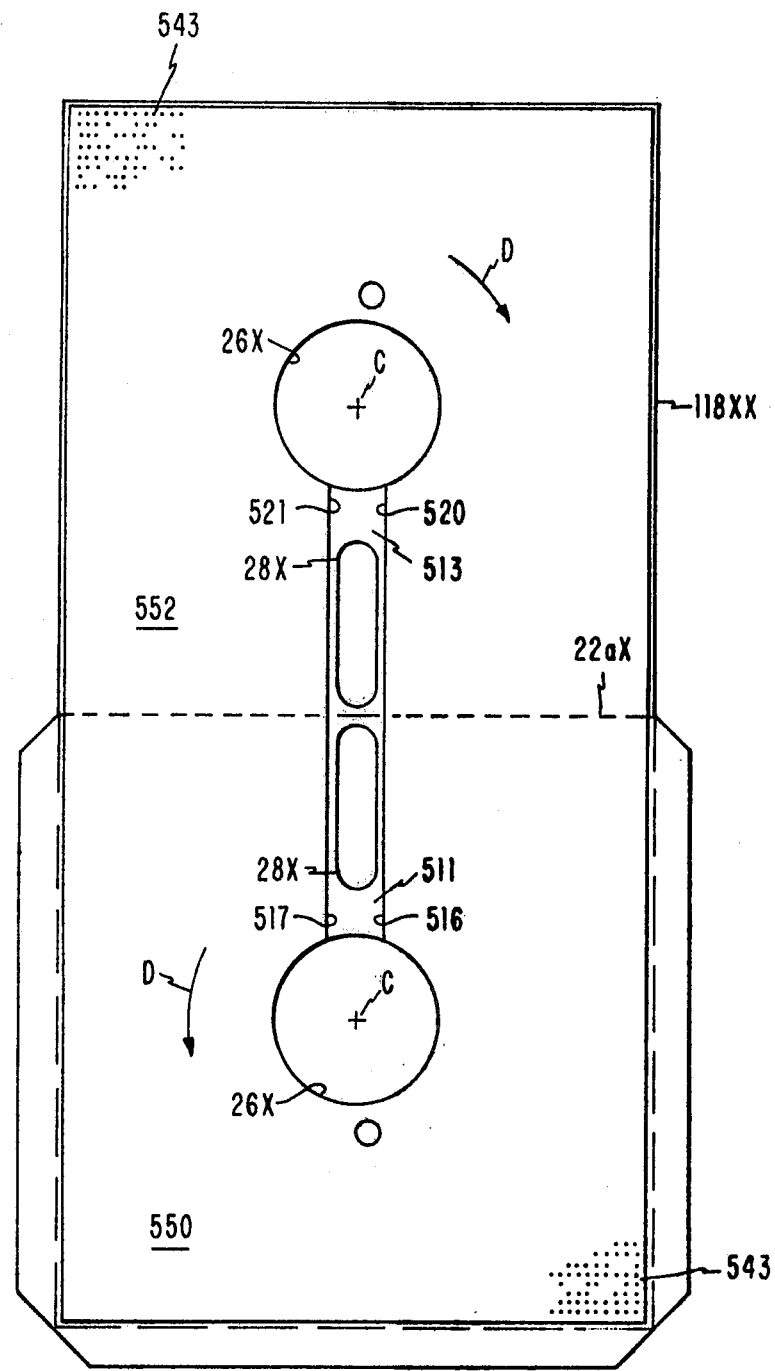
FIG. 7 is a plan view of a modified blank from which a modified disk-jacket assembly incorporating the principles of the invention may be made.

The disk-jacket assembly 22X may, if desired, be modified by omitting the gaps 510 and 512 located adjacent the flap 22cX, and the blank 118XX for this purpose is shown in FIG. 7. The omission of the gaps 510 and 512 allows only the gaps 511 and 513 to remain, on the opposite sides of the bend line 22aX and embracing the transducer or pressure arm receiving slots 28X. Either of the gaps 511 and 513 extends for somewhat less than ½ the diameter of disk 20X as is apparent from FIG. 7. With this arrangement, there are only the two U-shaped wiper panels 550 and 552 on the opposite faces of the disk 20X and affixed to the adjacent inner surfaces of the jacket 22X by means of the embossing spots 543. The wiper edges 516 and 520 thus remain out of coincidence with the disk entry edges 28X3 of the slots 28X for securing the advantages and favorable results as above mentioned in connection with the embodiment shown in FIGS. 1 and 2.

Figure 8:
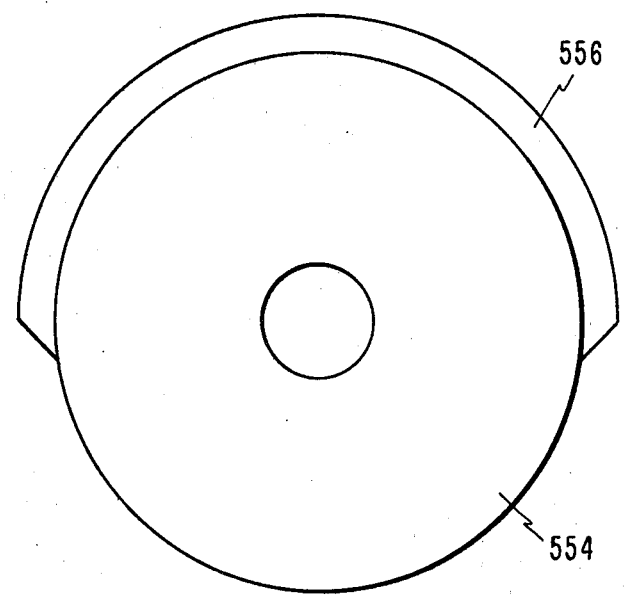
FIG. 8 is a modified slitter wheel that may be used in making the blank shown in FIG. 7.

The machinery used for making the blank 118XX is the same as that illustrated in FIG. 3 for making the blank 118X except that a pair of the slitter wheels 554 shown in FIG. 8 are substituted for the slitter wheels 536 and 537 shown in FIG. 3, and the slitter wheels 554 are driven in synchronism with the punch 544. The slitter wheel 554 shown in FIG. 8 has a discontinuous sharpened edge 556, and a pair of the slitter wheels 554 are so driven in synchronism with the punch 544 so that they slit only the distance spacing the centers C of the jacket openings 26X. The ends of the resulting slits by the sharpened slitter edges 556 may incidentally be anywhere within the openings 26X which are subsequently punched out of the blank 118XX by the punch 544. The wiper material discard from blank 118XX is that wiper material in the openings 26X and gaps 511 and 513, and this material is removed by any suitable means and is then discarded. The blank 118XX is then made into a finished disk-jacket assembly in the same manner as the blank 118X was used for this purpose.

In both embodiments of the disk-jacket assembly of the invention, the edges 516 and 520 are advantageously kept spaced from the disk entry edges 28X3 of the slots 28X adapted to receive a transducer, and in this manner no loose fibers can be swept by disk rotation into the slots 28X to interfere with data transfer. Although the wiper edges 517 and 521 are preferably spaced from the disk exit 28X4 of the slots 28X for ease of manufacture in particular, the edges 517 and 521 could conceivably be coincident with the edges 28X4, since the direction D of disk rotation would cause loose fibers to move in direction D into the adjacent wipe edges 517 and 521. For the improved results of the invention, the edges 516 and 520 are preferably close to and spaced a few millimeters from the disk entry edges 28X3. Also, the edge of the pressure pad outline 96X closest to the fabric edges 516 and 520 should preferably be adjacent to these fabric edges, such as within a couple of centimeters.

In the event that it is desired to incorporate an antistatic electrically conductive layer between the panels 502-505 or 550 and 552 and the inner surfaces of the jacket 22X which is similar to the electrically conductive layer 35 disclosed in U.S. Pat. No. 4,038,693, this may be accomplished simply by preliminarily plating the polyvinyl chloride acetate material or roll 530 with a conductive layer; and in this case the wiper material from roll 528 will be staked onto the plated polyvinyl chloride acetate from the roll 530 to form a strip of sandwich-like material having the polyvinyl chloride acetate base layer, an electrically conductive intermediate layer and the outer wiper layer from the roll 528.

Having thus described our invention, what we claim as new, and desire to secure by Letters Patent is:

1. In a magnetic record assembly including
   a magnetic disk of thin flexible material;
   a jacket having said magnetic disk disposed therein and having panels of a porous, low friction, dusting fabric lining positioned between and adhered to opposite, confronting faces of said jacket and covering substantially all the jacket surface confronting said magnetic disk to line said jacket for snugly encasing said disk and allowing the disk to be rotatably driven within the jacket; and
   an elongated opening in said jacket and a gap in said panels having edges that register with said jacket opening so that said opening may receive a magnetic transducer in data transferring relationship with said disk;
   the improvement wherein the side edge of said jacket opening and the edge at the panel gap adjacent to which increments of said disk first appear due to rotation of the disk are spaced from each other with the disk entry side edge of said fabric panel gap being positioned upstream of disk rotation with respect to the disk entry side edge of said jacket opening, whereby said disk is substantially continuously wiped by said panels while providing a space between said fabric and said jacket opening which excludes frayed or free fibers from the jacket opening.

2. A magnetic record assembly as set forth in claim 1, wherein the disk exit side edges of said jacket opening and fabric gaps, in which increments of said disk leave said openings due to rotation of the disk, being spaced from each other with the disk exit side edge of said fabric gap being positioned downstream of disk rotation with respect to the disk exit side of said jacket opening.

3. A magnetic record assembly as set forth in claim 1, said edges of said fabric extending for somewhat less than half the diameter of said disk so that the panel on the thickness of said jacket having said jacket opening therein is U-shaped.

4. A magnetic record assembly as set forth in claim 1, said disk entry side edge of said fabric opening being formed by slitting the fabric so as to reduce the number of free fabric fibers on said edge.

5. A magnetic record assembly as set forth in claim 1, wherein said fabric edges are formed by cutting to minimize the presence of free or frayed fibers and said fabric edges defining said fabric gap provide a space between the edges of constant width extending for substantially the complete diameter of said disk so as to define two separate ones of said panels lining the thickness of said jacket having said jacket opening therein, with the gap embracing said jacket opening.

6. In a magnetic record assembly including a magnetic disk of thin flexible material,
   a jacket having said magnetic disk disposed therein and having panels of a porous, low friction dusting fabric positioned between the opposite faces of the magnetic disk and the confronting surfaces of the jacket to line the jacket for snugly encasing said disk and allowing the disk to be rotatably driven within the jacket as so lined with the dusting fabric,
   said liner being secured to said jacket and substantially completely covering said jacket surfaces confronting the faces of said magnetic disk,
   said jacket having a pair of registering openings in its confronting surfaces for receiving a transducer and an opposite pressure member or for receiving two opposite transducers, and
   said fabric of said panels having edges defining a gap through the fabric on both surfaces of said jacket which are in register with said jacket openings to allow said transducers and pressure member to have contact with the disk,
   the improvement wherein the disk entry side edges of said registering fabric gaps and jacket openings adjacent to which increments of said disk first appear in said openings due to rotation of the disk, being spaced from each other with the disk entry side edges of said fabric gaps being positioned upstream of disk rotation with respect to the corresponding disk entry side edges of said jacket openings.

7. A magnetic record assembly as set forth in claim 6, said panels of dusting fabric being formed by two spaced strips of dusting fabric and from one jacket thickness onto the other jacket thickness.

* * * * *

UNITED STATES PATENT AND TRADEMARK OFFICE
CERTIFICATE OF CORRECTION

PATENT NO. : 4,263,634

DATED : April 21, 1981

INVENTOR(S) : Roger D. Chenoweth and Donald J. Smith

It is certified that error appears in the above—identified patent and that said Letters Patent is hereby corrected as shown below:

Column 8, line 54 after the word fabric, insert the words

--extending between opposite edges of said jacket--.

Signed and Sealed this

Ninth Day of November 1982

[SEAL]

Attest:

GERALD J. MOSSINGHOFF

Attesting Officer      Commissioner of Patents and Trademarks

Disclaimer 4,263,634—*Roger D. Chenoweth*, Rochester; *Donald J. Smith, Byron*, both of Minn., MAGNETIC DISK-JACKET ASSEMBLY. Patent dated April 21, 1981. Disclaimer filed Nov. 22, 1991, by the assignee, International Business Machines Corp.

The term of this patent subsequent to June 30, 1991, has been disclaimed.
[*Official Gazette February 18, 1992*]